United States Patent [19]

Collier

[11] Patent Number: 4,680,156
[45] Date of Patent: Jul. 14, 1987

[54] SHEATH CORE COMPOSITE EXTRUSION AND A METHOD OF MAKING IT BY MELT TRANSFORMATION COEXTRUSION

[75] Inventor: John R. Collier, Athens, Ohio
[73] Assignee: Ohio University, Athens, Ohio
[21] Appl. No.: 786,441
[22] Filed: Oct. 11, 1985
[51] Int. Cl.$^4$ ............................................. B29C 47/86
[52] U.S. Cl. ..................... 264/171; 264/209.6; 264/210.5; 264/211.17; 264/211.24; 264/327
[58] Field of Search .................. 264/171, 173, 209.6, 264/176 R, 176 F, 178 R, 210.5, 327, 211.24, 211.17; 425/133.1, 144, 461, 462

[56] References Cited

U.S. PATENT DOCUMENTS

| | | | |
|---|---|---|---|
| 2,063,180 | 12/1936 | Meyer et al. | 18/8 |
| 2,433,711 | 6/1948 | Sisson | 18/54 |
| 2,439,813 | 4/1948 | Kulp et al. | 28/82 |
| 2,439,815 | 4/1948 | Sisson | 28/82 |
| 2,932,079 | 4/1960 | Dietzsch | 28/82 |
| 2,989,798 | 6/1961 | Bannerman | 428/373 |
| 3,244,785 | 4/1966 | Hollandsworth et al. | 264/171 |
| 3,322,870 | 5/1967 | Sacks | 264/209.5 |
| 3,382,220 | 5/1968 | Bowman, Jr. | 425/378 R |
| 3,458,615 | 7/1969 | Bragaw, Jr. et al. | 264/171 |
| 3,541,198 | 11/1970 | Ueda et al. | 264/171 |
| 3,579,414 | 5/1971 | Ueda et al. | 161/173 |
| 3,593,513 | 7/1971 | Reese | 57/140 |
| 3,616,183 | 10/1971 | Brayford et al. | 161/175 |
| 3,658,634 | 4/1972 | Yanagi et al. | 161/175 |
| 3,671,620 | 6/1972 | Inoue | 264/171 |
| 3,679,541 | 7/1972 | Davis et al. | 161/175 |
| 3,725,192 | 4/1973 | Ando et al. | 161/175 |
| 3,760,046 | 9/1973 | Schwartz et al. | 264/47 |
| 3,886,015 | 5/1975 | Turner | 156/166 |
| 3,949,042 | 4/1976 | Utz | 264/173 |
| 4,053,270 | 10/1977 | Collier | 425/144 |
| 4,056,344 | 11/1977 | Lemelson | 425/462 |
| 4,059,949 | 11/1977 | Lee | 57/140 BY |
| 4,075,378 | 2/1978 | Anton et al. | 428/97 |
| 4,309,476 | 2/1978 | Nakamura et al. | 428/374 |
| 4,348,346 | 9/1982 | Thompson | 264/171 |
| 4,379,117 | 4/1983 | Baird, Jr. et al. | 264/514 |
| 4,390,581 | 6/1983 | Cogswell et al. | 264/173 |
| 4,451,306 | 5/1984 | Verne | 264/210.5 |
| 4,485,062 | 11/1984 | Dawes et al. | 264/176 F |

FOREIGN PATENT DOCUMENTS 51-10863  1/1976  Japan ..................... 425/133.5

*Primary Examiner*—Jeffery Thurlow
*Attorney, Agent, or Firm*—John L. Gray

[57] ABSTRACT

A composite extrusion, such as a fiber, film or ribbon, having an inner core and an outer sheath, wherein the inner core is made of a molecularly oriented polymer capable of being rigidified by imposition of a temperature gradient and the sheath is made of a polymer wherein its molecules are generally not oriented. A method of making such a composite extrusion utilizing melt transformation coextrusion wherein the inner core-forming material is caused to assume a molecular orientation coaxial to the longitudinal axis of said core while in a molten state and then forced through a reducing die while being subjected to a temperature gradient while surrounded by the liquid sheath-forming material such that crystallization in at least the outer skin of said core occurs within the die but the sheath-forming material does not crystallize until the extrudate exits the die.

5 Claims, 2 Drawing Figures

SHEATH CORE COMPOSITE EXTRUSION AND A METHOD OF MAKING IT BY MELT TRANSFORMATION COEXTRUSION

BACKGROUND OF THE INVENTION

Methods for the extrusion of highly oriented polymeric materials exist in the prior art. An example of such is U.S. Pat. No. 4,053,270, Collier.

Melt coextrusion in which two materials are coextruded, one forming a core and one forming a sheath, are also known in the prior art and are set forth in the attached Information Disclosure Statement. However, all of these processes, including melt transformation extrusion, as exemplified in U.S. Pat. No. 4,537,270, Collier, as well as solid state extrusion and hydrostatic extrusion have upper limitations on elongation to break of approximately ten percent. Furthermore, in the processes of the prior art above listed, the extrudate is either crystallized in the die prior to exiting or crystalline billets are used so that the frictional drag of the crystalline extrudate limits the extrusion rate to relatively low values on the order of one foot or less a minute. While the processes of the prior art can produce moduli values comparable to that of aluminum, the extrusion so produced cannot be produced at high enough rates to make these processes commercially attractive. Furthermore, such materials that are currently available will not produce the existing commercial processes to produce the orientation levels and consequent moduli values capable of being produced by melt transformation extrusion, solid state extrusion or hydrostatic extrusion.

SUMMARY OF THE INVENTION

The invention involves the creation of a sheath core extrusion by molecular orientation of the core-forming material in a confined space while in a molten condition as is done in melt transformation extrusion. Then the molten, confined, molecularly oriented, core-forming material is surrounded by the liquid sheath-forming material as the combination enters a reducing die, which contains a temperature gradient of an amount such that at least the outer skin of the core being formed will rigidify while in the die but the sheath-forming material will remain in its liquid state until exiting from the die. The liquid sheath-forming material has a dual function. It provides a crack inhibiting layer, thus protecting the normally brittle high molecularly oriented core and thus permitting greater elongation to break charcteristics. The sheath-forming material also functions as a lubricating layer inside the die in which the core material is crystallizing. The result is to produce a dramatic increase in extrusion rate, limited only by the ability to supply the material to the die. Orders of magnitude enhancement of the extrusion rate have been demonstrated. Extrusion rates of forty feet per minute, compared with a typical melt transformation extrusion of the same material of one foot per minute have been achieved. The process is applicable to any polymer used as a core material which can be rigidified or assisted in rigidifying by imposing a temperature gradient. In the case of thermoplastic crystallizable and glassy polymers, a cooling temperature gradient is required. Reactive thermosetting polymers can be assisted in rigidifying by imposition of a heating temperature gradient.

It is therefore an object of this invention to provide a composite extrusion having an inner core and an outer sheath in the shape of fibers, ribbons, films and the like, wherein the inner core is a molecularly oriented polymer capable of being rigidified by imposition of a temperature gradient and a sheath that is made of a polymer wherein said molecules are generally not oriented.

It is a further object of this invention to provide such an extrusion having very high moduli values and extremely high elongation to break characteristics.

It is also an object of this invention to provide a melt transformation coextrusion process of making such a product.

These together with other objects and advantages of the invention will become apparent from the following detailed description of the invention.

DETAILED DESCRIPTION OF THE INVENTION

Figure 1:
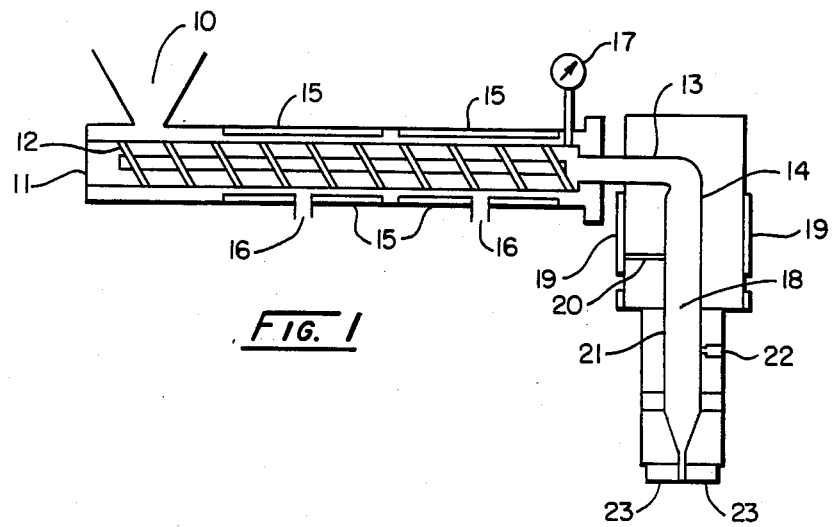
FIG. 1 is a schematic diagram of the apparatus for carrying out the method according to the present invention.

Referring now to the drawings, and particularly to FIG. 1, a typical extrusion apparatus is shown provided with a feed hopper 10 which leads into an extruder barrel 11, which is provided with a screw 12, which discharges an extrudate under pressure through channel 13 into reservoir 14. Heating elements 15-15 may surround barrel 11 and appropriate thermostats 16-16 and pressure gauge 17 may also be employed. In chamber 14 and in any transfer lines the extrudate is maintained at a pressure well above atmospheric and a temperature near its atmospheric melting point. The extrudate in container 14 is maintained in a fluid condition by means of heating elements 19-19 while in chamber 14 and the temperature of the extrudate may be monitored by a suitable thermocouple 20. The extrudate enters the die 21 wherein its temperature is monitored by thermocouple 22 and the discharge portion of the die may be cooled or heated by means of the heat exchanger 23. This is shown in greater detail in FIG. 2.

Figure 2:
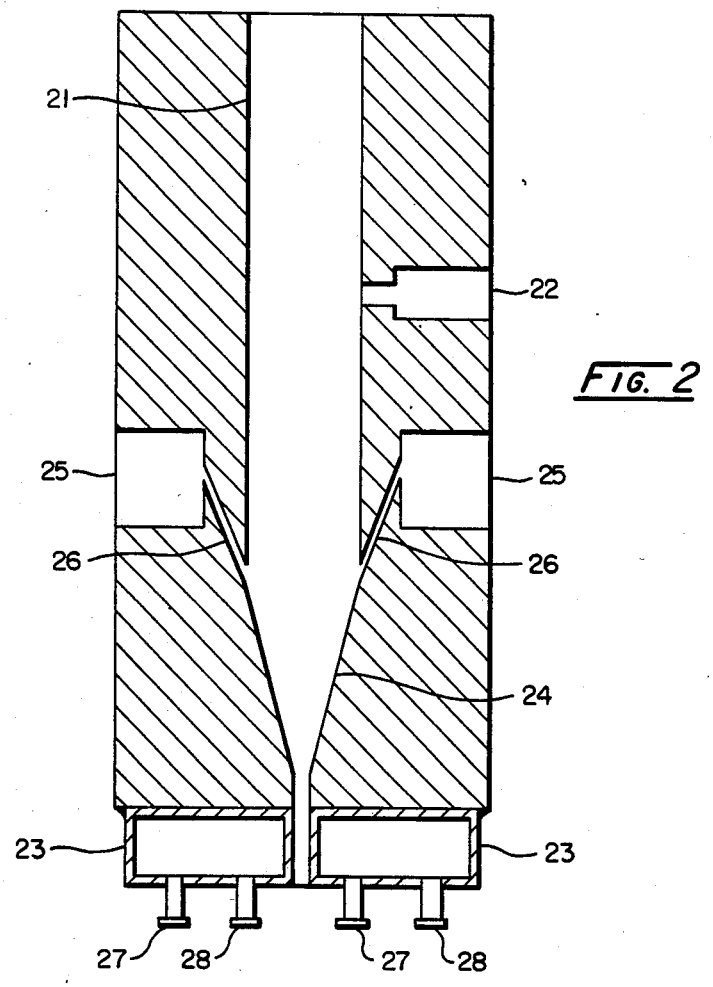
FIG. 2 is an enlarged view of a typical die which may be used to practice the method constituting a portion of this invention.

FIG. 2 is an enlarged cross section of the die 21 showing the thermocouple 22 and is provided with a reducing section 24 at the upper end of which the liquid sheath-forming material is introduced through openings 25-25 and passes through slots 26-26 so as to surround the core-forming material while in a fluid state as the core-forming material enters the upper portion of the reducing section of the die. The elongated flow that develops in this converging flow region of the die is primarily responsible for the induced orientation. Since the downstream temperature gradient is chosen to rigidify the core, and the sheath material is chosen to not rigidify in the die, the orientation is retained in the core and relaxed out of the sheath. The liquid sheath-forming material is introduced into openings 25-25 surrounding the core-forming material by means of a conventional plasticating single screw extruder comparable to that shown in FIG. 1. This has not been duplicated in the drawing for the sake of clarity. A twin screw extruder or other source of molten polymer could also be used for either material. The heat exchange elements 23-23 are provided with inlets 27-27 and outlets 28-28. Suitable variable speed conventional take-up devices, which are not shown, would withdraw the resultant extrudate from the die.

Depending upon the cross-sectional shape of the die, the resultant extrusion will be a fiber, ribbon, or a film, etc. The temperature gradient that is maintained in the die will depend upon the type of material used as a core-forming material. For example, if the core material is a thermoplastic, crystallizable or glassy polymer, the temperature gradient from the upper portion of the die to its exit will be of a cooling nature. On the other hand, if the core material is a reactive thermosetting polymer that can be assisted in rigidifying by imposing a heating temperature gradient, the temperature gradient throughout the die to its exit point will be of a heating rather than a cooling nature.

Utilizing the method of the present invention, moduli values comparable to those obtained with solid state extrusion and hydrostatic extrusion can be achieved even though operating at pressures in the range of 2,000 psi to 8,000 psi, whereas the above mentioned processes use 2,000 or greater atmospheres. In both solid state and hydrostatic extrusion, the processes are operated on the material in the solid state whereas in the method of the instant invention the core-forming material is oriented in the fluid state.

In comparing the method of this invention with conventional melt transformation extrusion, much higher line speeds were achieved. For example, a three-layer ribbon extrudate consisting of a polypropylene core with polyethylene skin layers on either side was extruded by means of this process. The extrusion rate was forty feet per minute as compared with a fractional foot per minute for a polypropylene extrusion alone utilizing melt transformation extrusion and the elongation to break using the instant invention was nearly 1,000 percent as compared with approximately ten percent in the case of melt transformation extrusion.

In choosing melt transformation core-forming material and sheath-forming material, the sheath-forming material should remain in a liquid state, either molten or in solution during flow through the die and not rigidify until after exiting the die, thereby relieving some if not most of the orientation induced in the sheath layer during flow. The sheath material should have a lower viscosity than the core at the operating conditions in order to cause encapsulation of the core. Preferably, the sheath layer should be lower in viscosity by at least a factor of four when compared with the core layer.

If the core material is a crystallizing, thermoplastic material, a sheath material of the same magnitude molecular weight and a difference in melting point of around 40° C. would satisfy these criteria. Typical sheath/core combinations that are acceptable are polyethylene/polypropylene; polyethylene or polypropylene/polyester; polybutylene terephthlate/polyethylene terephthlate; polyethylene or polypropylene/nylon; nylon 6/nylon 66, nylon 610 or nylon 612. Other combinations may be used including sheaths that become glassy after exiting the die.

If the core material is a glassy material, it is still necessary to use a sheath layer material that has a viscosity low enough to encapsulate the core at the operating conditions. As with a crystallizable core material it is necessary, whether the sheath material can crystallize or not, that the sheath not become rigid until after it exits from the die. Sheath/core combinations in this case include but are not limited to polystyrene or acrylonitrile, butadiene stryene terpolymer (ABS)/poly (alphamethyl styrene) or polycarbonate.

If the core material is a reactive thermosetting material, the sheath material requirement of lower viscosity is rather critical, since the core material will initally have a low viscosity unless contacted with the sheath material after some reaction has occurred. It is possible that the sheath material could also react but be limited to the formation of a thermoplastic, higher molecular weight skin.

The actual proportion of the sheath and core material to be used is dependent upon the emphasis of sheath versus core properties. However, it may be necessary to have at least a tenth of a micron thick sheath to effectively lubricate, encapsulate, and crack inhibit the core and this requirement may be relatively independent of the thickness of the core. Thicker sheath layers allow the shearing velocity gradient inside the die to be less sharp and enhance the encapsulation tendency, but lower the contribution of high strength and modulus contributed by the oriented core, since these mechanical properties are related to the relative amounts of each layer.

Various types of extruded products may be manufactured utilizing this process having the described characteristics. These products include but are not limited to medical sutures, tire cords, automotive body and skin parts, aircraft and spacecraft body and skin parts, pipes, tubes, conduits, missile shells, electromagnetic receptor dishes, and internally reinforced fibers and films.

While this invention has been described in its preferred embodiment, it is appreciated that slight variations may be made therefrom without departing from the true scope and spirit of the invention.

What is claimed is:

1. A method of making a composite extrusion having an inner core and an outer sheath which comprises
    causing said inner core-forming material to assume a molecular orientation coaxial to the longitudinal axis of said core while said core-forming material is in a molten state and in a confined space,
    surrounding said core-forming material with a liquid sheath-forming material while in said confined space,
    withdrawing said molecularly-oriented core-forming material while surrounded by said sheath-forming material from said confined space through a reducing die having a temperature gradient between said confined space and the exit from said die of an amount such that crystallization of at least the outer skin of said formed core will occur prior to said extrusion leaving said die but such that said sheath-forming material will not crystallize until said extrusion exits said die.

2. The method of claim 1 wherein said inner core-forming material is selected from the group consisting of thermoplastic crystallizable polymers and glassy polymers rigidified by imposition of a cooling temperature gradient and wherein the temperatures gradient in said reducing die is a cooling temperature gradient.

3. The method of claim 1 wherein said inner core-forming material is a reactive thermosetting polymer and wherein said temperature gradient in said reducing die is a heating temperature gradient.

4. The method of claim 1 wherein said liquid sheath-forming material has sufficiently lower viscosity than the core-forming material at the operating conditions of the process so as to cause encapsulation of the core.

5. The method of claim 4 wherein the sheath-forming material is lower in viscosity than said core-forming material by at least a factor of 4.

* * * * *